UNITED STATES PATENT OFFICE.

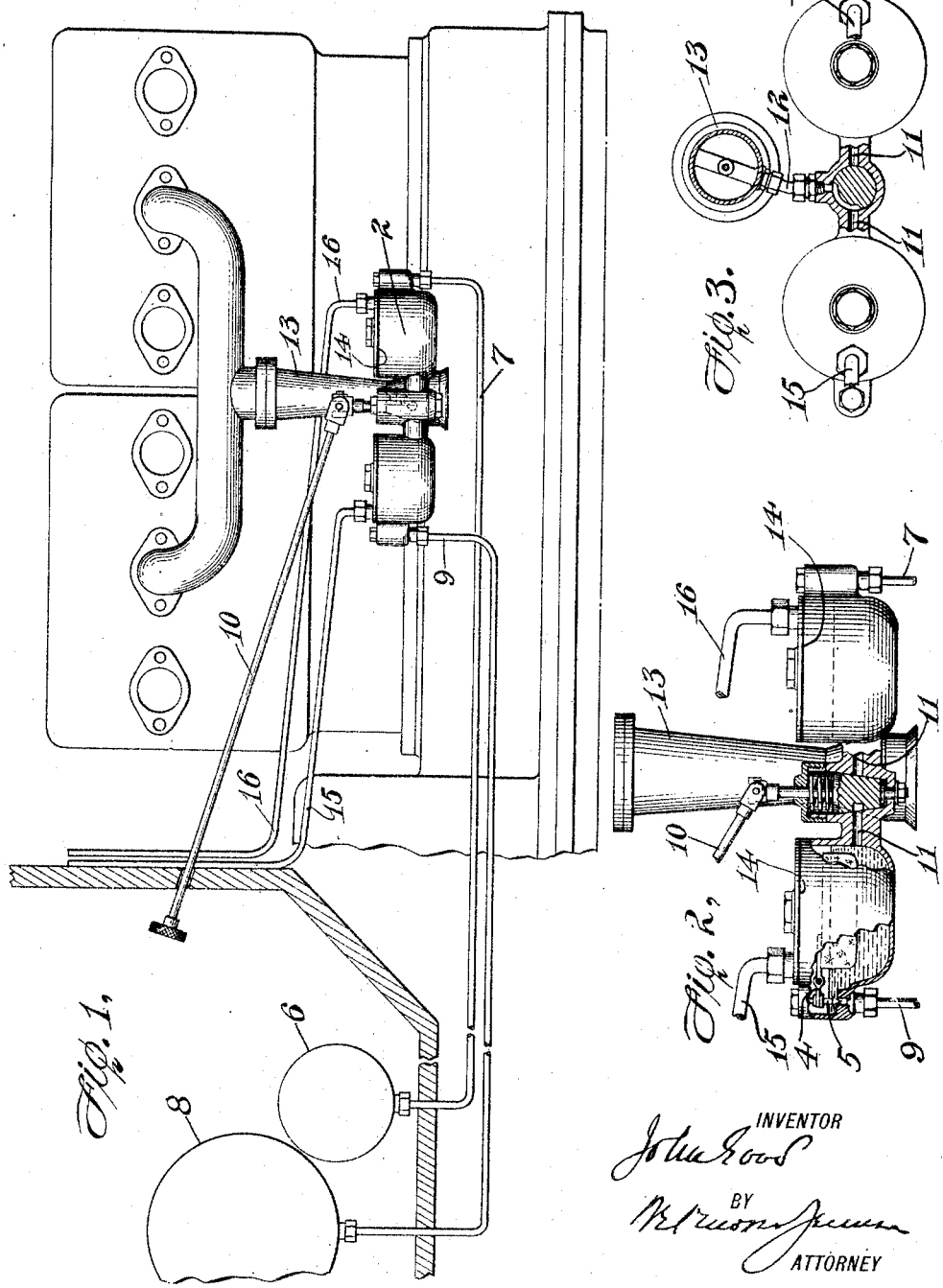

JOHN GOOD, OF BROOKLYN, NEW YORK.

AUTOMOBILE-ENGINE FUEL-SUPPLY.

1,365,980.  Specification of Letters Patent.  Patented Jan. 18, 1921.

Application filed February 11, 1918. Serial No. 216,597.

*To all whom it may concern:*

Be it known that I, JOHN GOOD, United States citizen, residing in Brooklyn, N. Y., have invented the following described Improvements in Automobile - Engine Fuel-Supply.

The invention relates to automobile and tractor engines having double float chambers one for supplying liquid fuel for preliminarily heating the engine and the other for supplying the engine with fuel. In this apparatus as heretofore used the objection has been present that liquid fuel has been wasted in considerable amounts from the float chamber not in use. According to the present invention these objections are eliminated in a very simple manner without requiring any extensive changes in existing structure and without appreciable complication therein. The invention consists in making the cover to the float chamber fit sufficiently tight upon the receptacle to prevent leakage and connecting the air vent in such cover to a vent tube extending upwardly to an opening to atmosphere high enough to create a hydrostatic head in such tubes equal to that at which the fuel is supplied to the float chamber.

In the accompanying drawings:

Figure 1 is a side elevation more or less diagrammatic of an automobile engine and its fuel system;

Fig. 2 is an enlarged side elevation of a double bowl carbureter partly in section; and Fig. 3 is a plan thereof partly in section.

The two float chambers marked 1 and 2 respectively may be assumed to be of the usual type comprising a float 3 connected by a lever 4 to a valve 5 which controls the admission of fuel to the float chamber from the supply tube. In the case taken for illustration it may be assumed that gasolene is supplied to the float chamber 2 from a tank 6. The supply pipe from this tank is marked 7 and it will be understood that the gasolene is used when starting the engine when cold. The other float chamber 1 may be understood to be supplied with kerosene by pipe 9, from the supply tank 8, for the normal operation of the engine. The junction between the two float chambers contains a valve chamber and the tapered valve plug therein is operated through the rod 10 from the dash and serves to connect the outlet duct 11 from one or the other float chamber to the delivery pipe 12 leading to the carbureter 13, at the same time closing the connection of the other chamber thereto. Thus the fuel from either source may be supplied to the engine and the change from one to the other may be quickly made.

The cover 14 of each float chamber is clamped or screwed thereon with a gasket 14 to prevent leakage at the joint and the interior of each chamber is put in connection with atmosphere through tubes 15 and 16 which are led from the respective chambers to the dashboard or some other convenient support where their upper open ends will be disposed above the liquid level in the fuel tanks 6 and 8 as indicated. In the normal operation of either float chamber the vent tube serves the usual purpose of preserving a constant or atmospheric pressure in the liquid chamber, which is necessary for uniform operation of the carbureter.

At other times as when the particular float chamber is shut off and not in use, its vent tube guards against wastage of fuel by leakage past its inlet valve. Such leakage commonly occurs from the vibration of the float incident to the travel of the vehicle and may fill the float chamber above the normal liquid level therein and also fill the vent tube 15 or 16, as the case may be, up to, or even beyond the level of the liquid in the supply tank, but no escape of liquid fuel can take place. Thereafter, when that particular float chamber is connected to the carbureter, the liquid will flow thereto under a temporarily abnormal hydrostatic head due to the weight of liquid in the vent tube and this will tend to provide a desirable initial richness of the fuel mixture flowing to the engine at the time of changing fuel and eliminate the necessity for manual adjustment of the carbureter. It will be apparent that the same principle may be applied to double float chamber apparatus regardless of whether employed to deliver the same or different kinds of fuels or whether the two chambers supply the same carbureter spray nozzle or otherwise, and it will also be obvious that one or both chambers may be provided with the vent tubes as conditions of normal use may require.

Claim.

In an automobile engine using two kinds of fuel, the combination of a single carbureter for both fuels, two closed, liquid fuel chambers with their outlets connected to said carbureter, each containing a liquid fuel inlet valve and a float controlling said valve and each connected with a liquid supply receptacle at a higher level, a single manually operated valve controlling said outlets and adapted to close one outlet when the other is opened, and a vent tube connected to one of said chambers and extended upwardly beyond the level of the supply receptacle for that chamber.

In testimony whereof, I have signed this specification.

JOHN GOOD.